United States Patent [19]

Lisak et al.

[11] Patent Number: 4,838,512

[45] Date of Patent: Jun. 13, 1989

[54] JACK HOLD DOWN DEVICE

[75] Inventors: Stephen P. Lisak, Arab, Ala.; James T. McGuire, Royal Oak, Mich.

[73] Assignee: Ryder International and Textron, Inc., Providence, R.I.

[21] Appl. No.: 233,157

[22] Filed: Aug. 17, 1988

[51] Int. Cl.$^4$ .............................................. A47B 97/00
[52] U.S. Cl. ..................................... 248/503; 403/387
[58] Field of Search ................. 248/503, 316.4, 316.6, 248/295.1, 296, 307, 500; 254/418; 403/387

[56] References Cited

U.S. PATENT DOCUMENTS

| | | | |
|---|---|---|---|
| 2,642,243 | 6/1953 | Kindorf | 403/387 X |
| 2,915,267 | 12/1959 | Kaysing | 248/316.6 X |
| 3,787,024 | 1/1974 | Dzus, Jr. | 248/503 |
| 3,866,704 | 2/1975 | Bowers et al. | 248/503 X |

*Primary Examiner*—Ramon O. Ramirez
*Attorney, Agent, or Firm*—R. A. Giangiorgi

[57] ABSTRACT

A jack hold down apparatus is provided for threadably engaging an elongate, projecting externally threaded post member and advancing and retracting therealong for respectively engaging and disengaging an edge part of an automotive jack for holding the same in, and releasing the same from, engagement with a given surface. The apparatus comprises a first component comprising a jack-engaging member including a body having a through opening for receiving the post member therethrough and defining an axis, a radially projecting lip portion for engaging an edge part of the jack, and an axially projecting connecting portion for receiving a second component. The second component comprises a manually graspable knob having a through opening coxially alignabel with the through opening of the first component and a cooperating connecting portion alignable with the first component connecting portion for assembly therewith in a generally radial direction, so as to be non-removable therefrom in the axial direction. A post-engaging member comprises an internally threaded body internally sized to threadably engage the post and externally sized to fit at least partly within one of the first and second components, and an assembly member has an external configuration for interfitting within at least portions of both of the first and second component aligned through openings to thereby hold the first and second components and the post-engaging member together in assembled condition, such that rotation of the knob results in threadable advancement and retraction of the assembly thus formed relative to the post member.

10 Claims, 2 Drawing Sheets

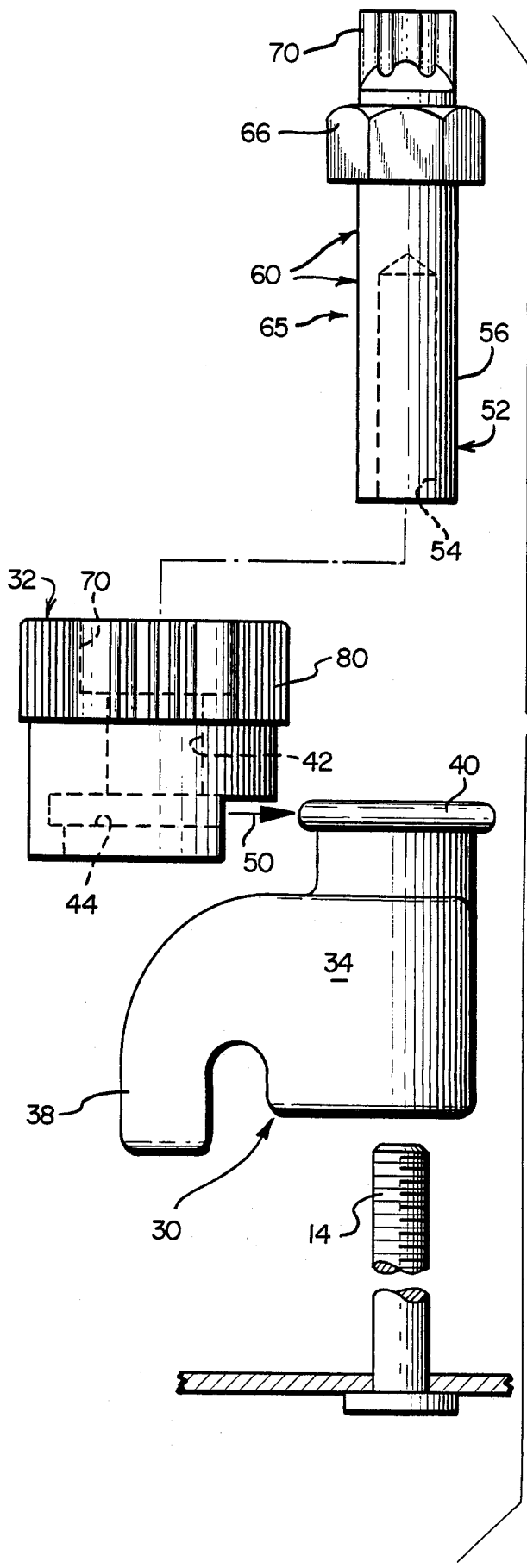
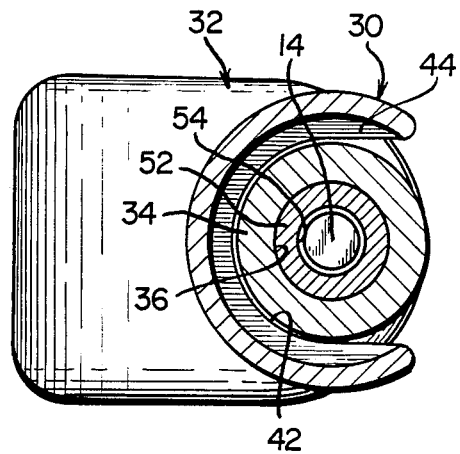
FIG. 5
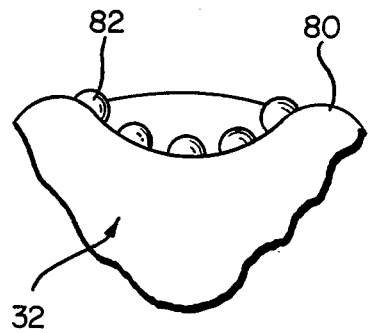
FIG. 6
FIG. 4

JACK HOLD DOWN DEVICE

BACKGROUND OF THE INVENTION

This invention is directed generally to the automotive arts, and more particularly to a jack hold down device or apparatus for releasably holding an automotive jack in place relative to a given surface of an automotive vehicle.

Generally speaking, automotive vehicles are frequently provided with a jack for interfitting with a portion of the vehicle frame to lift and lower the same for purposes of changing tires, or possibly for effecting other repairs. Some arrangement, usually in a trunk or other storage portion of the vehicle is provided for normally mounting the factory-supplied jack.

Generally speaking, a bolt is held in a captive relation with some formed lip or eyelet portion of the vehicle surface to which the jack is to be mounted. This bolt has an elongate threaded shank extending upwardly to receive a nut or other nut-like component, which in turn bears against some predetermined surface or lip portion of the jack body to hold the same engaged against the vehicle surface.

Such jack hold down devices have generally been heretofore supplied as a relatively simple internally threaded nut-like member, preferably having an enlarged radially projecting external handle portion for manually grasping to advance and retract the same relative to the projecting bolt. The advancement and retraction is generally by threadable engagement with the bolt for correspondingly releasing or engaging the jack. However, such jack hold down knobs have generally heretofore been provided in such a manner as to be entirely removable from the projecting bolt. Accordingly the nut-like knob member is frequently disengaged, and misplaced or lost, in practice. When the knob or nut-like component is unavailable, no means remains to reliably store the jack and hold it in place relative to the desired vehicle surface.

While it is possible to deform or destroy endmost threads on the projecting bolt to prevent such removal of the knob or nut-like member, this approach raises a number of problems. For example, this approach requires a separate machining or tool-engagement operation for deforming the threads. In relatively high speed assembly lines, such additional machining or machinery-performed operations are generally to be avoided so as to minimize the time required for assembly. Moreover, operation of such machinery requires relatively higher skill of the workers involved in the assembly process, which is also to be avoided in order to optimize the economy and speed of assembly. In this regard, it is quite difficult to assure that the necessary machining operation will be carried out to a degree necessary to prevent removal of the nut-like component in all cases, and yet avoid destruction of the threads to such a degree as to prevent the desired degree of movement of the nut relative to the bolt.

By the same token, it will be appreciated that the provision of some third component, such as a secondary locking nut or the like also fails to totally correct the above-noted problems. For example, the provision of such a third component requires yet another step in the assembly. Moreover, a further locking nut would by its nature also be removable from the bolt and capable of being lost, thereby also permitting the eventual removal and misplacement or loss of the actual hold down nut or knob component. Moreover, the provision of two separate components which the user must manipulate in order to engage and release the jack provide a further complication in the operation of the jack hold down arrangement. It is of course desirable to provide the most simple and reliable sort of operation for such consumer-oriented and consumer-directed components of an automotive vehicle.

OBJECTS AND SUMMARY OF THE INVENTION

Accordingly, it is an object of this invention to provide a novel and improved jack hold down apparatus which substantially avoids the above-noted problems.

Briefly, and in accordance with the foregoing object, a jack hold down apparatus for threadably engaging an elongate, projecting externally threaded post member and advancing and retracting therealong for respectively engaging and disengaging an edge part of an automotive jack for holding the same in, and releasing the same from, engagement with a given surface comprises a first component comprising jack-engaging means including a body having a through opening for receiving said post member therethrough and defining an axis, a radially projecting lip portion for engaging said edge part of said jack, and an axially projecting connecting portion for receiving a second component; said second component comprising manually graspable knob means having a through opening coaxially alignable with the through opening of said first component and a cooperating connecting portion alignable with said first component connecting portion for assembly therewith in a generally radial direction, so as to non-removable therefrom in the axial direction; post-engaging means comprising an internally threaded body internally sized to threadably engage said post and externally sized to fit at least partly within one of said first and second components, and assembly means having an external configuration for interfitting within at least portion of both of said first and second component aligned through openings to thereby hold the first and second components and said post-engaging means together in assembled condition, such that rotation of the knob means results in threadable advancement and retraction of the assembly thus formed relative to said post member.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 4 is an exploded view illustrating the components of the jack hold down apparatus of the invention and their assembly both with each other and with a bolt component provided in the automotive vehicle of FIG. 1;

FIG. 5 is a sectional view taken generally in the plane of the line 5—5 of FIG. 3; and FIG. 6 is a greatly enlarged cut away view of a side portion of a knob component in accordance with a preferred form of the invention, illustrating additional gripping ridges or knurls on an external surface thereof.

DETAILED DESCRIPTION OF THE ILLUSTRATED EMBODIMENT

Figure 1:
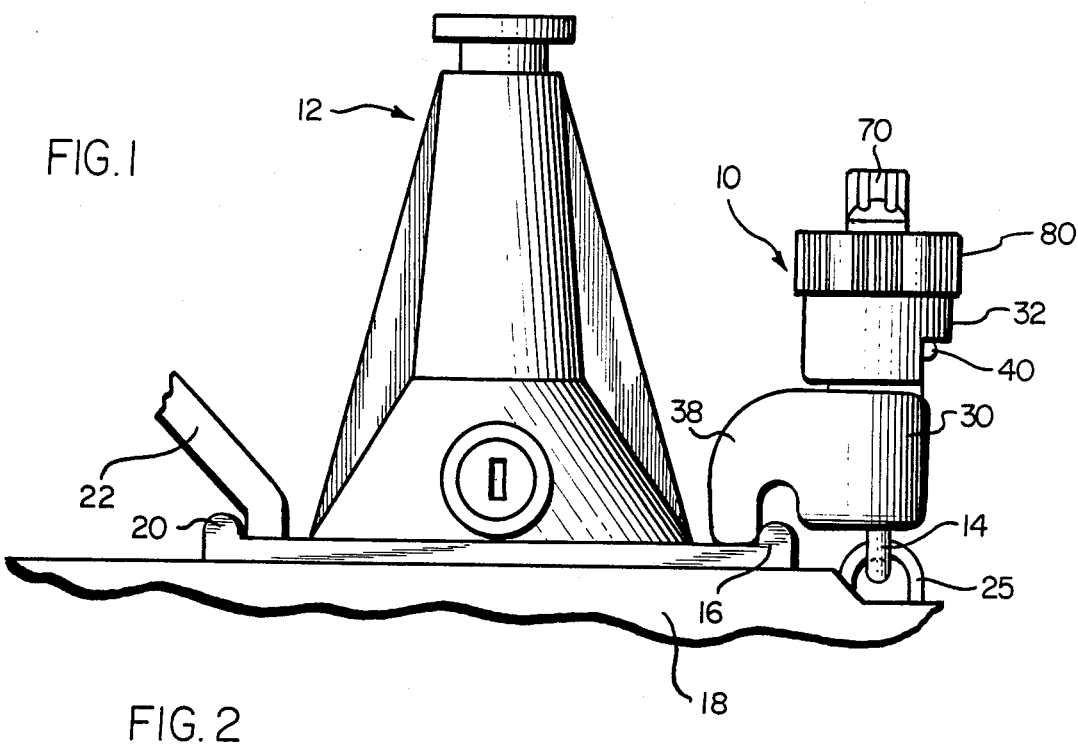
FIG. 1 is a side elevation of an automotive jack mounted to a given surface of an automotive vehicle using a jack hold down apparatus in accordance with the invention.
Figure 2:
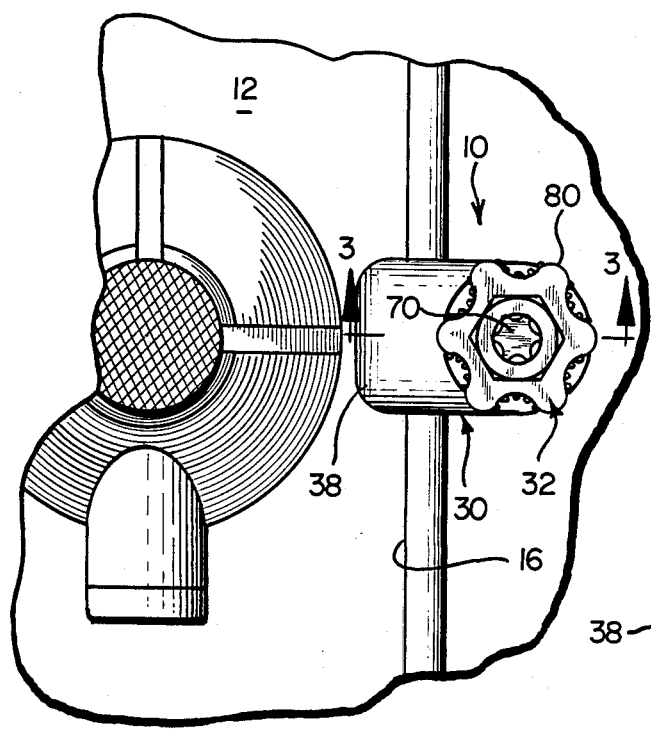
FIG. 2 is a partial top plan view of the assembly of FIG. 1.

Turning now to the drawings and initially to FIG. 1, a jack hold down device in accordance with the invention is designated generally by the reference numeral 10. In FIG. 1, the jack hold down device 10 is shown in connection with an automotive jack 12, shown somewhat in diagrammatic form. The jack hold down device 10 is arranged for threadably engaging an elongate, projecting externally threaded post or bolt-like member 14 and for advancing and retracting therealong for respectively engaging and disengaging an edge part 16 or other convenient part of the jack 12. The post member or bolt member may be a J-bolt or any other suitable bolt having an enlarged head or other means which is held in a captive relation with a projection, loop or other suitable means, as diagrammatically illustrated at 25, coupled with the surface 18.

This engagement and disengagement with edge part 16 of jack 12 is such as to hold the jack 12 in engagement with a given surface 18 of the automotive vehicle, or alternatively to release the jack 12 for use. A similar opposite edge part 20 of the jack 12 may be held in place by a spring-like clamping device 22 or any other suitable means.

Figure 3:
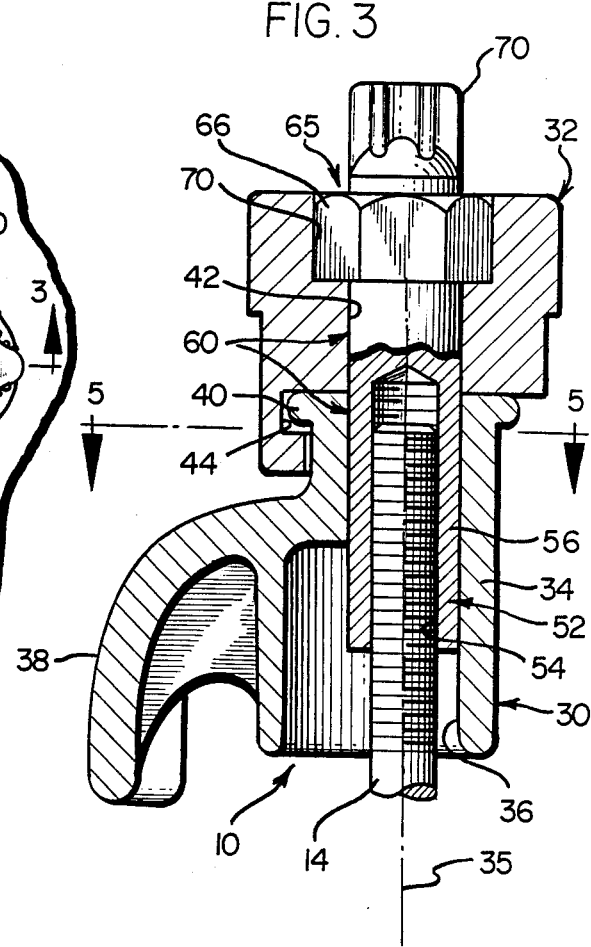
FIG. 3 is an enlarged sectional view taken generally along the line 3—3 of FIG. 2.

Referring now also to FIGS. 3 and 4, it will be seen that the jack hold down device or apparatus of the invention comprises first and second components 30, 32. The first component comprises a jack-engaging means or member including a body portion 34 which has a through opening 36 for receiving bolt or post member 14 therethrough, and defining an axis 35 generally coincident with the axis of the bolt 14. The jack-engaging member 30 further includes a radially projecting lip or hook-like portion 38 which overhangs and engages the edge portion 16 of the jack 12. It will be noted that the edge portion 16 may include a raised ridge to facilitate this engagement. The jack-engaging means further includes a connecting portion 40 for receiving the second component 32.

The second component 32 comprises manually graspable knob means having a through opening 42 which is coaxially alignable with the through opening 36, that is, generally coincident with axis 35. The knob means also has a cooperating connecting portion 44 alignable with the first component connecting portion 40 for assembly therewith in a generally radial direction, as indicated in FIG. 4.

More particularly, it will be seen that the connecting means 40 comprises a generally radially extending lip 40 which extends circumferentially, coaxially with axis 35. Cooperatively, and as best viewed in FIG. 5, the cooperating connecting means 44 comprises a generally U-shaped undercut groove or recess formed in the knob-like body or member 30, which is dimensioned to slidably interfit about the shoulder portion 40 when moved in the radial direction relative thereto as indicated by arrow 50 in FIG. 4. Once thus assembled, it will be seen that the engagement of the shoulder 40 and groove 44 is such that the two members cannot thereafter be disassembled, or otherwise relatively moved appreciably in the axial direction. Rather, movement back in the opposite direction to direction 50, that is, a generally radial direction is required for disassembly of the two components 30, 32. However, it will be noted that shoulder 40 and groove 44 interfit in such a fashion as to permit free relative rotation therebetween.

The apparatus of the invention further includes post-engaging means comprising an internally threaded body 52 which is internally sized as indicated at reference numeral 54 for threadable engagement with the threaded bolt or post 14. Moreover, the body 52 is externally sized as indicated at 56 for interfitting at least partly within at least one of the two components 30 and 32. As will be seen hereinbelow, the form of this member or means 52 may vary without departing from the invention, whereby the member specifically illustrated in the drawings is by way of example.

The apparatus of the invention further includes assembly means designated generally by reference numeral 60 which has an external configuration for interfitting within at least portions of both of the first and second component aligned through openings 42, 36 to thereby hold the first and second components and the post-engaging means 52 together in assembled condition. It will be noted that with insertion of the means or member 60 through both of the aligned through openings 42, 36, the relative radial movement (generally opposite direction 50 in FIG. 4) between the components 30 and 32, and hence their disassembly, is now completely precluded. Moreover, the engagement among the components accomplished by the addition of the assembly means and post-engaging means is such that bidirectional rotation of the knob means 32 results in the threadable advancement and retraction of the assembly thus formed relative to the post or bolt member 14.

In the embodiment illustrated herein, the post-engaging means and the assembly means 52, 60 comprise a one-piece integrally formed retainer member 65. It will be understood, however, that the invention is not so limited, and that the post-engaging and assembly means may indeed comprise separate members or structures, without departing from the invention. In the illustrated embodiment, however, the retainer member 65 includes an elongate, tubular internally threaded portion comprising the post-engaging means or portion 52 which has the internal thread 54 sized for threadable engagement with the post or bolt member 14. The external cylindrical configuration 56 of retainer 65 is sized for insertion through the through openings of 36, 42 of both of the first and second components 30 and 32. External surface 56 is also sized for free rotation at least relative to through opening 36, and preferably relative to opening 42 as well.

The retainer member 65 further includes an enlarged head portion 66 which is configured for non-rotatable engagement with a complementary recess 70 formed in the knob portion or body 32. In the illustrated embodiment this non-rotatable engaging head portion 66 is formed as a hex-shaped fastener component, and the complementary internal surface of the recess 70 is also six-sided to accommodate the same, such that the knob 32, when rotated will also rotate the retainer member 65, and thus advance and retract the entire assembly relative to the post or bolt 14.

Moreover, in the preferred embodiment illustrated herein, the retainer member enlarged head portion also includes a tool engagable surface or portion 70 for facilitating an initial, e.g., factory, installation of the apparatus with the post or bolt member 14. In the illustrated embodiment, this tool-engagable surface comprises a TORX,-configured driver head, which extends axially outwardly of the knob member or means 32. However, it will be understood that other types of tool-engagable surface may be utilized, or indeed the tool-engagable surface may be omitted entirely, without departing from the invention, in its broader aspects.

Additionally, the knob means or member 32 of the illustrated embodiment includes a manually graspable external surface 80, which facilitates grasping or rotation thereof by hand. In the illustrated embodiment, this surface 80 takes the form of a generally hex-lobular configuration, similar to the TORX configuration of the TORX driver head 70. Moreover, in the illustrated embodiment additional grasping means such as a plurality of raised ridges, bumps or knurls 82 are additionally formed along external surface portions of the gripping surface 80.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A jack hold down apparatus for threadably engaging an elongate, projecting externally threaded post member and advancing and retracting therealong for respectively engaging and disengaging an edge part of an automotive jack for holding the same in, and releasing the same from, engagement with a given surface, said apparatus comprising: a first component comprising jack-engaging means including a body having a through opening for receiving said post member therethrough and defining an axis, a radially projecting lip portion for engaging said edge part of said jack, and an axially projecting connecting portion for receiving a second component; said second component comprising manually graspable knob means having a through opening coaxially alignable with the through opening of said first component and a cooperating connecting portion alignable with said first component connecting portion for assembly therewith in a generally radial direction, so as to be non-removable therefrom in the axial direction; post-engaging means comprising an internally threaded body internally sized to threadably engage said post and externally sized to fit at least partly within one of said first and second components, and assembly means having an external configuration for interfitting within at least portions of both of said first and second component aligned through openings to thereby hold the first and second components and said post-engaging means together in assembled condition, such that rotation of the knob means results in threadable advancement and retraction of the assembly thus formed relative to said post member.

2. Apparatus according to claim 1 wherein said post engaging means and said assembly means comprise a one-piece integrally formed retainer member.

3. Apparatus according to claim 2 wherein said retainer member includes an enlarged head portion for non-rotatable interengagement with a complementary formed recess in said second component for holding the retainer member in non-rotatable condition relative to said knob means.

4. Apparatus according to claim 2 wherein said retainer member enlarged head portion further includes a tool-engagable surface for facilitating initial installation of the apparatus with said post member.

5. Apparatus according to claim 1 wherein said connecting portion of said first component comprises a circumferentially extending shoulder portion coaxially aligned with said axis defined by the through opening thereof.

6. Apparatus according to claim 5 wherein said cooperating connecting portion of said second component comprises a generally U-shaped internal groove dimensioned for slidably interfitting about said shoulder portion in a generally radial direction for assembly of the second component to the first component, said groove being further dimensioned for free rotation relative to said shoulder portion but for preventing disassembly of the second component from the first component by relative movement therebetween in the axial direction.

7. Apparatus according to claim 1 wherein said knob means includes at least one radially projecting manually graspable portion for facilitating grasping and rotation thereof by hand.

8. Apparatus according to claim 2 wherein said retainer member comprises an elongate, tubular internally threaded portion sized for threadable engagement with the post member and having an external cylindrical configuration sized for insertion through the through openings of said first and second components.

9. Apparatus according to claim 8 wherein said retainer member further comprises an enlarged head portion configured for non-rotatable engagement with said second component.

10. Apparatus according to claim 9 wherein said second component defines a recess of complementary form for receiving said head portion non-rotatably therewithin.

* * * * *